(12) United States Patent
MacKenzie et al.

(10) Patent No.: US 9,062,639 B1
(45) Date of Patent: Jun. 23, 2015

(54) DUAL INLET AIR INDUCTION SYSTEM WITH PANEL FILTER FOR VEHICLE ENGINE

(71) Applicant: GM GLOBAL TECHNOLOGY OPERATIONS LLC, Detroit, MI (US)

(72) Inventors: Steven K. MacKenzie, West Bloomfield, MI (US); Eric R. Tucker, Waterford, MI (US); Kevin J. Dunn, Birmingham, MI (US); Michael G. Leffert, Howell, MI (US); Hugo Figueroa Rosas, Metepec (MX); John P. Person, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/254,517

(22) Filed: Apr. 16, 2014

(51) Int. Cl.
  B60K 13/02 (2006.01)
  F02M 35/16 (2006.01)
  F02M 35/024 (2006.01)
  B62D 25/12 (2006.01)
  B62D 25/18 (2006.01)

(52) U.S. Cl.
  CPC ........... *F02M 35/161* (2013.01); *F02M 35/024* (2013.01); *B62D 25/12* (2013.01); *B62D 25/18* (2013.01)

(58) Field of Classification Search
  USPC ................ 180/68.3; 55/312, 385.3, 498, 502, 55/313–314, 309; 123/41.65, 198 E
  See application file for complete search history.

(56) References Cited

U.S. PATENT DOCUMENTS

| 6,705,272 | B2 * | 3/2004 | Leipelt et al. ............. 123/198 E |
| 7,398,770 | B2 | 7/2008 | Acuna, Sr. et al. |
| 8,048,179 | B2 * | 11/2011 | Miller et al. .................... 55/312 |
| 2004/0025828 | A1 | 2/2004 | Cutts et al. |

OTHER PUBLICATIONS

Horatiu Boeriu, Macht Schnell Stage 2 Intake Charge kit for the BMW M3, www.bmwblog.com/2010/09/10/macht-schnel-stage-2-intake-charge-kit-for-the-bmw-m3/.

\* cited by examiner

*Primary Examiner* — John Walters
*Assistant Examiner* — James Triggs
(74) *Attorney, Agent, or Firm* — Quinn Law Group, PLLC

(57) ABSTRACT

An air induction system includes a housing defining an inner cavity. The housing has a first wall with a first air inlet, a second wall with a second air inlet, and an air outlet for directing air to the vehicle engine. A panel filter is mounted within the housing and divides the inner cavity so that the first inlet and the second inlet are upstream of the panel filter and the outlet is downstream of the panel filter when air flows through the housing from either of the air inlets to the air outlet and through the panel filter from a first side of the filter to a second side of the filter. The first air inlet, the second air inlet, and the panel filter are positioned so that the first side is lower than the second side when the housing is installed in the vehicle.

20 Claims, 4 Drawing Sheets

DUAL INLET AIR INDUCTION SYSTEM WITH PANEL FILTER FOR VEHICLE ENGINE

TECHNICAL FIELD

The present teachings generally include an air induction system for a vehicle engine.

BACKGROUND

Engine air induction systems are designed to provide dry filtered air for combustion with fuel. Generally, engine performance is improved when the induction system delivers the lowest temperature air with the least pressure drop. Air drawn from within the engine compartment is generally at a higher temperature than air drawn from other locations. Vehicle engine compartments have higher air temperatures than compared to their ambient surroundings.

SUMMARY

Factors such as pressure drop through the air induction system, inlet air temperature, noise, and contaminant prevention are considered in achieving an optimal design for an air induction system. The air induction system has dual inlets, both receiving air sourced from outside of the engine compartment, and has a panel filter that filters air received through the inlets. More specifically, the air induction system includes a housing configured to be installed in the vehicle, and defining an inner cavity. The housing has a first wall with a first air inlet, a second wall with a second air inlet, and an air outlet for directing air to the vehicle engine. A panel filter is mounted within the housing and divides the inner cavity so that the first inlet and the second inlet are upstream of the panel filter and the outlet is downstream of the panel filter when air flows through the housing from the air inlets to the air outlet and through the panel filter from a first side of the filter to a second side of the filter. The first air inlet, the second air inlet, and the panel filter are positioned so that the first side is lower than the second side when the housing is installed in the vehicle. In this manner, a cost effective panel filter can be used in a relatively small packaging space to filter air drawn from two sources outside of the engine compartment and presents this air to the lower first side of the filter to improve water management.

In one embodiment, the air induction system is for a vehicle that has a vehicle body forming an engine compartment. The vehicle body includes a fender at a side of the engine compartment. A hood is connected to the vehicle body and is positionable in a closed position to cover the engine compartment. The hood has an opening external to the engine compartment. The hood has an inner panel with an entrance, and has an exit in fluid communication with the entrance. The exit is also in fluid communication with the first air inlet of the housing when the hood is in the closed position. In one embodiment, the air induction system also includes a duct secured to the hood inner panel and configured to route air from an opening to the entrance. The duct is routed to promote contaminant management.

The relatively low air inlet temperature and relatively low pressure drop achievable by use of the air induction system with the dual inlet housing can improve vehicle metrics, such as hill climb time, engine performance with hill climb in extreme temperatures, and engine performance in stop-and-go city traffic. Testing has shown increased horsepower and decreased charge air cooler thermal load. Additionally, with the unfiltered side (i.e., the "dirty side") of the inner cavity formed in the housing being positioned low in the housing, water ingestion management is improved.

The above features and advantages and other features and advantages of the present teachings are readily apparent from the following detailed description of the best modes for carrying out the present teachings when taken in connection with the accompanying drawings.

DETAILED DESCRIPTION

Figure 1:
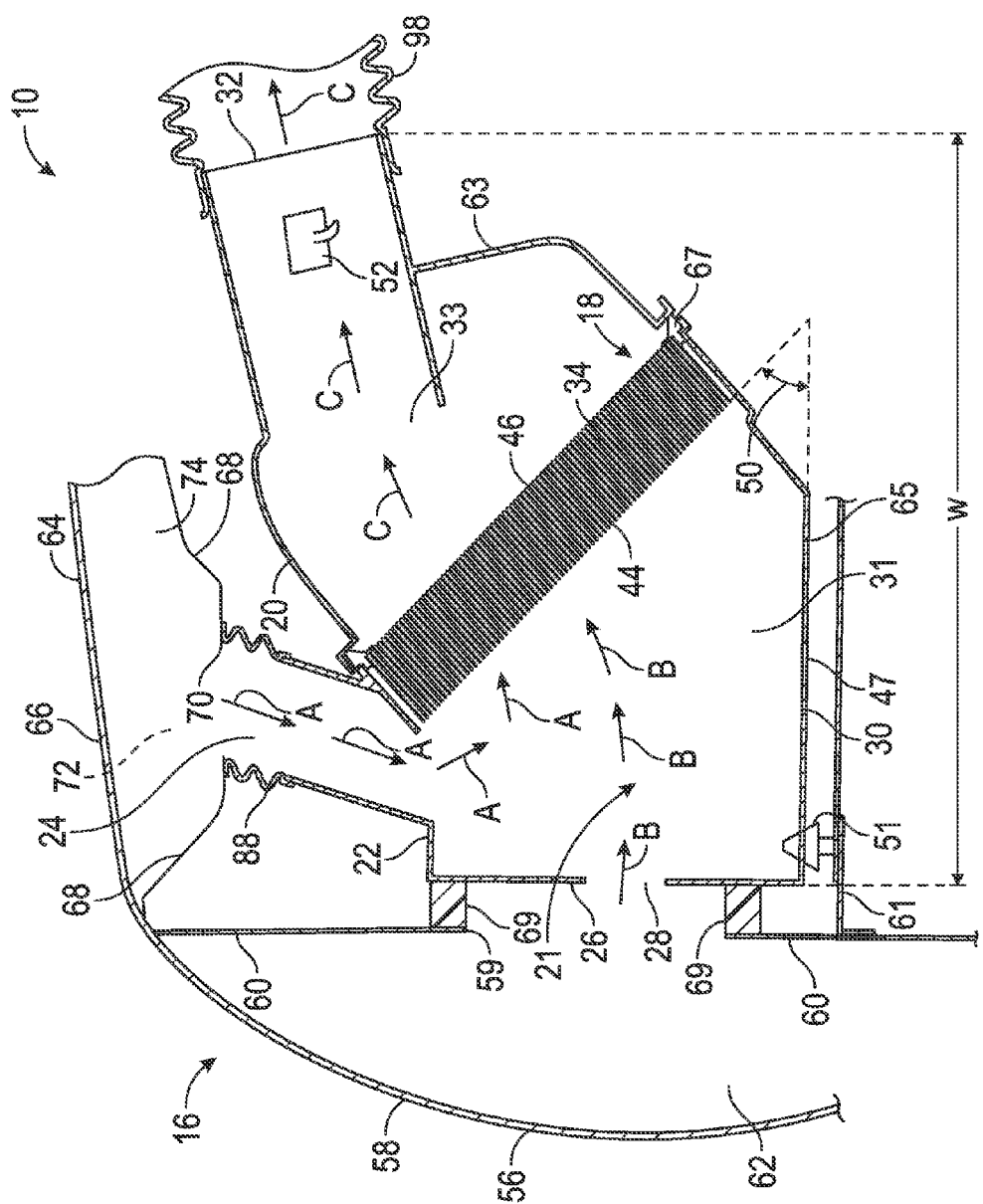
FIG. 1 is a schematic illustration in fragmentary cross-sectional view taken at lines 1-1 in FIG. 4 of a portion of a vehicle with an air induction system for an engine.
Figure 3:
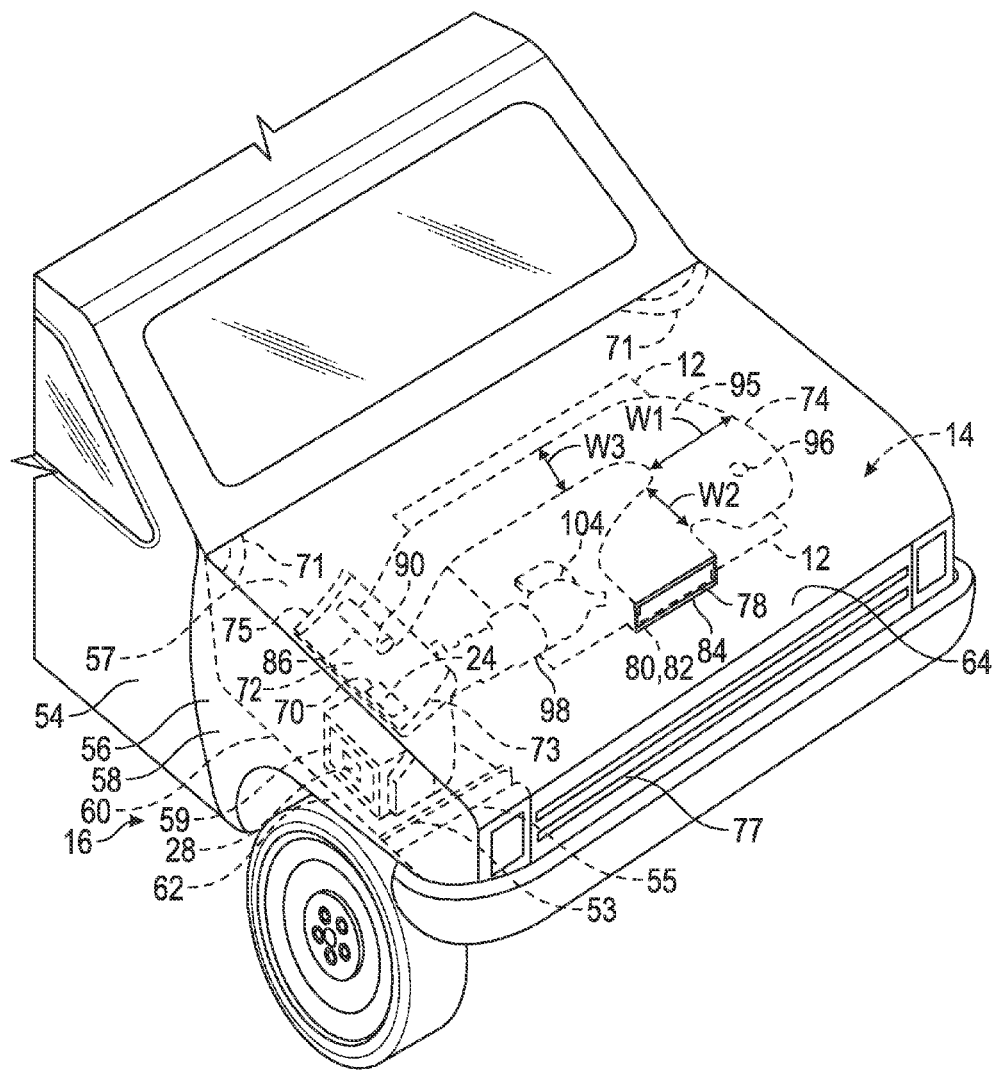
FIG. 3 is a schematic illustration in fragmentary perspective view of the vehicle with the air induction system of FIG. 1 and with an air duct secured to a vehicle hood.

Referring to the drawings, wherein like reference numbers refer to like components throughout the views, FIG. 1 shows a portion of an air induction system 10 that is configured to provide air to a vehicle engine 12 shown in FIG. 3. The engine 12 is an internal combustion engine, such as a diesel engine. For example, the engine 12 could be a spark-ignition engine. The air is provided from two different air sources external to the engine compartment 14 of the vehicle 16. With this arrangement, pressure drop across the air induction system 10 and temperature of the air provided to the engine 12 are both reduced in comparison to an air source within the engine compartment 14, and in comparison to using only one air inlet. Additionally, a panel filter 18 is used in the air induction system 10, rather than a cylindrical filter. Panel filters are typically less expensive than cylindrical filters, but may require more packaging space to achieve the same amount of filtered area. However, with the air induction system 10 as described herein, the panel filter 18 is positioned to minimize packaging space requirements in the engine compartment 14.

Referring to FIGS. 1, 2, 3 and 4, the air induction system 10 includes a housing 20 that defines an inner cavity 21. The housing 20 can be multiple integrally attached housing portions. The housing 20 has a first wall 22 with a first air inlet 24, and a second wall 26 with a second air inlet 28. The first wall 22 is positioned at an angle with respect to the second wall 26. This enables the first air inlet 24 to be generally orthogonal to the second air inlet 28. The housing 20 also has a bottom wall 30 which is configured to be positioned lower than the first and second air inlets 24, 28 when the housing 20 is secured in the vehicle 16 as discussed herein. The housing 20 also forms an air outlet 32 for directing air to the vehicle engine 12 as described with respect to FIG. 3. A duct 98, referred to herein as a second duct 98 connects the housing 20 at the outlet 32 to the engine 12. The duct 98 has bellows portions. A hiss resonator 100 is mounted in the duct 98, as described herein. The housing 20 is secured to the vehicle 16 with isolated attachments 51 that snap or otherwise attach to a tray 53 supported by a portion of the vehicle body and/or the vehicle frame 55 with one or more brackets 61.

Figure 2:
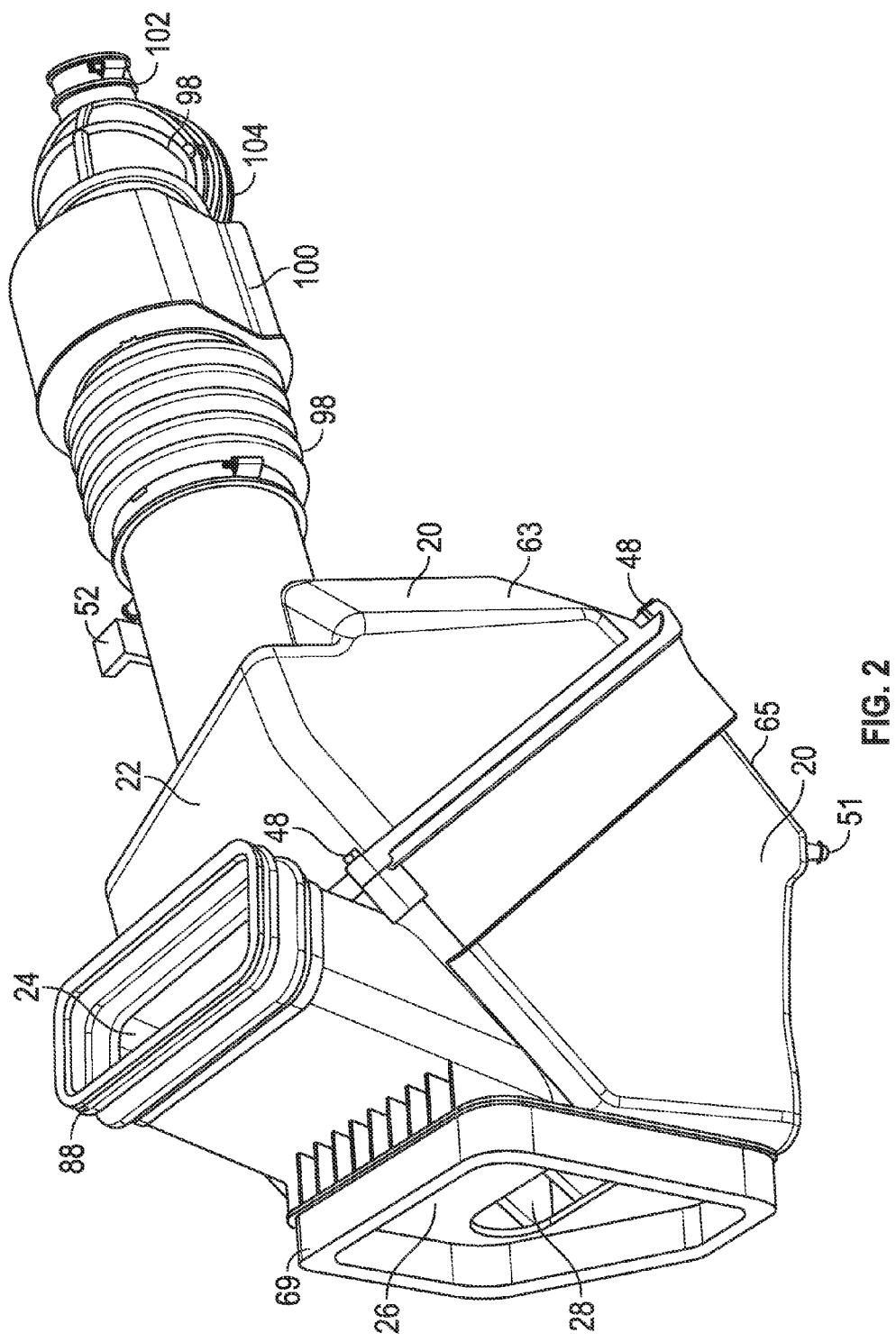
FIG. 2 is a schematic illustration in perspective view of the air induction system of FIG. 1.

The air induction system 10 includes the panel filter 18 supported by the housing 20 to divide the inner cavity 21 into an unfiltered side 31 and a filtered side 33, and require air to flow through the panel filter 18 to reach the air outlet 32 from either of the air inlets 24, 28. As best shown in FIG. 1, the panel filter 18 includes a pleated membrane 34 supported by first and second housing portions 63, 65 via a seal 67. The seal 67 serves as a sealing support generally around the periphery of the pleated membrane 34. FIG. 2 shows fasteners 48 that extend through portions of the housing 20 to secure the first housing portion 63 to the second housing portion 65. Alternatively, the housing portions 63, 65 could be hinged or clamped to one another. The filter seal 67 may be compressed between the housing portions 63, 65 at the interface, as shown in FIG. 1. In other embodiments, a support frame may be positioned to support the panel filter, and the seal 67 can attach the support frame to the housing portions 63, 65. A "panel filter" such as panel filter 18 is generally box-shaped, and allows air to flow in a continuous direction through the filter, as opposed to a cylindrical filter in which air flows through the filter from an external cavity to an internal cavity, or vice-versa. While cylindrical filters may provide the same amount of filter area in a more compact arrangement, they are generally more costly.

Figure 4:
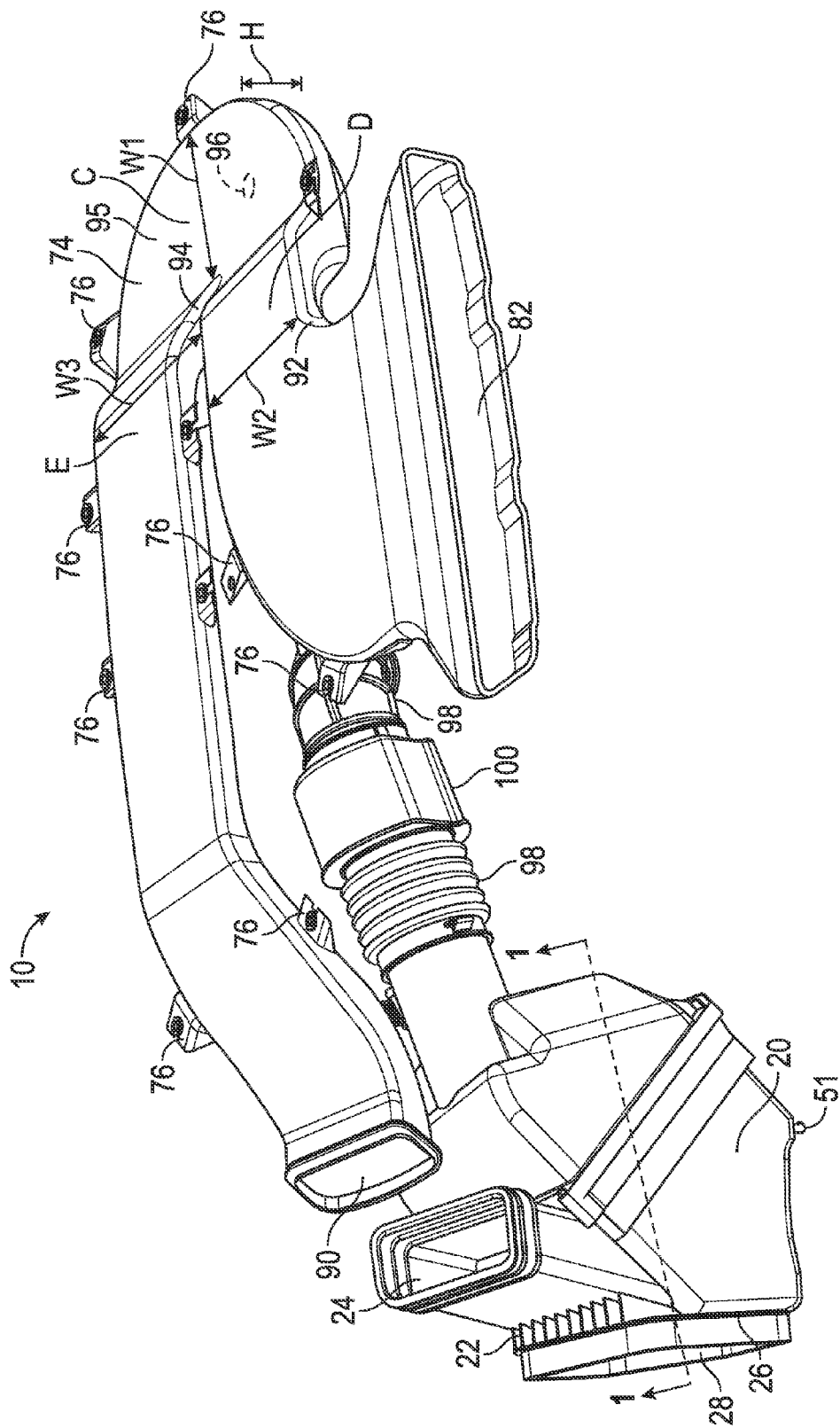
FIG. 4 is a schematic illustration in perspective view of the air induction system of FIG. 1 positioned in relation to the air duct of FIG. 3.

The pleated membrane 34 has a first side 44 facing the unfiltered side 31 of the inner cavity 21, and a second side 46 facing the filtered side 33 of the inner cavity 21. The panel filter 18 is mounted within the housing 20 and divides the inner cavity 21 so that the first air inlet 24 and the second air inlet 28 are upstream of the panel filter 18 and the air outlet 32 is downstream of the panel filter 18. Air flows through the housing 20 from either of the air inlets 24, 28 to the air outlet 32, and through the panel filter 18 from the first side 44 to the second side 46. Air flow from the first air inlet 24 is represented by arrows A. Air flow from the second air inlet 28 is represented by arrows B. Air flow from the outlet 32 is represented by arrows C. FIGS. 1, 2 and 4 show the housing 20 generally in the same orientation in which it is secured to the vehicle 16 in FIG. 3. The first air inlet 24 is positioned at least partially above the panel filter 18, the second air inlet 28 is positioned at least partially below the panel filter 18, and the panel filter 18 is positioned so that unfiltered air enters the panel filter 18 from below the panel filter 18. With both air inlets 24, 28 on the first side 44 of the pleated membrane 34, contaminants will be separated from the air flow prior to the air exiting the housing 20 through the air outlet 32. A mass air flow sensor 52 is secured to the housing 20 so that it extends into the air flow exiting the housing 20. The mass air flow sensor 52 also extends outside of the housing 20, as shown in FIG. 2, and is operatively connected by wires (not shown) to an engine controller (not shown) and provides mass air flow data used by the controller to control the engine 12. This arrangement could also be used for air induction systems which do not use mass air flow sensing for engine control.

The panel filter 18 is spaced from the bottom wall 30, and is positioned above the bottom wall 30. Any moisture filtered out of the air flow by the filter 18 will collect at the bottom wall 30. A drain opening 47 is provided in the bottom wall 30. Because the panel filter 18 is spaced from the bottom wall 30, it will be removed from any pooled moisture, and will not act as a wick. The panel filter 18 is positioned so that the housing 20 adjacent the first side 44 is at an acute angle 50 relative to the bottom wall 30. With the filter 18 tipped or angled in this manner, the overall width W of the housing 20 is less than if the filter 18 were horizontal.

The vehicle 16 has a vehicle body 54 forming the engine compartment 14. The vehicle body 54 includes a fender 56 at a side of the engine compartment 14. The fender 56 has a fender outer panel 58 and a fender inner panel 60. The fender inner panel 60 borders and defines the side 57 of the engine compartment 14. The fender inner panel 60 is represented only with a hidden outline of its periphery in FIG. 3. A portion of the fender inner panel 60 is also shown in FIG. 1. The fender inner panel 60 has an opening 59. A cavity 62 is formed by and between the fender outer panel 58 and the fender inner panel 60. The second air inlet 28 opens towards the fender 56. A seal 69 secured to the wall 26 generally abuts the fender inner panel 60 so that the second air inlet 28 is in fluid communication with the fender cavity 62 through the fender-opening 59. The second air inlet 28 is thus positioned to receive air from the outside of the engine compartment 14. As an alternative to the embodiment shown, the second air inlet 28 could receive air from the front of the vehicle through a duct. As shown in FIG. 3, the second air inlet 28 is smaller than the fender opening 59, as the second air inlet 28 is optimized for a desired air flow rate. Air is provided to the second air inlet 28 from the fender cavity 62. The fender cavity 62 is at least partially protected by the fender outer panel 58 from contaminants including water and snow. Additionally, air in the fender cavity 62 is at least partially protected from the relatively high temperature air in the engine compartment 14 by the fender inner panel 60. Air in the fender cavity 62 is generally drawn in from outside of the vehicle 16. Accordingly, the second air inlet 28 is provided with relatively low temperature air. In another embodiment, a duct can be routed from the area of the grille 77 to the air inlet 28.

As shown in FIG. 3, a hood 64 is connected to the vehicle body 54 such as by pivoting hinges 71 at a rearward side of the hood 64. The hood 64 is positionable in a closed position in FIG. 3 to cover the engine compartment 14. The hood 64 has a hood outer panel 66 and a hood inner panel 68 joined to the hood outer panel 66. The hood inner panel 68 is generally in closer proximity to the engine compartment 14 than the hood outer panel 66 when the hood 64 is closed. The hood inner panel 68 has an opening 70 that is in fluid communication with the first air inlet 24 when the hood 64 is closed. A cavity 72 is formed between the hood inner panel 68 and the hood outer panel 66. The opening 70 is also referred to herein as an exit of the hood inner panel 68, as it serves as an exit of the cavity 72. When the hood 64 is in the closed position, the cavity 72 is in fluid communication with the first air inlet 24 through the opening 70. As shown in FIG. 3, a forward wall 73 extends from hood outer panel 66 to the hood inner panel 68, and a rearward wall 75 extends from the hood outer 66 panel to the hood inner panel 68 to enclose the cavity 72.

Relatively low temperature outside air is provided to the cavity 72 and hence to the first air inlet 24 through the hood 64 and through a first duct 74 secured to an underside of the hood inner panel 68. Specifically, referring to FIGS. 3 and 4, the duct 74 is secured to the bottom of the hood inner panel 68 by fasteners (not shown) such as bolts or "fir tree" fasteners that extend through tabs 76 around a periphery of the duct 74 into fastener openings (not shown) in the hood inner panel 68. The hood outer panel 66 has a forward-facing opening 78 (shown in FIG. 3) through which air is directed to an opening 80 in the hood inner panel 68. A trim piece 84 can be secured to the hood outer panel 66 around the forward-facing opening 78. The duct 74 has a forward-facing opening 82 that mates to the opening 80 so that air from outside of the vehicle 16 is directed through the forward-facing opening 78 of the hood outer panel 66 into the duct 74. In other embodiments, the hood 64 could be configured to route air from the opening 78 to the opening 70 by providing internal structure between the hood outer panel 66 and hood inner panel 68 to form an integral duct within the hood 64. The forward-facing opening 78 of the hood 64 reduces noise level at a side of the vehicle 16 (i.e., pass-by noise performance) in comparison to a side inlet opening. Because there are two openings to allow the energy to escape, i.e., the fender opening 59 and second air inlet opening 28 within the fender 56, engine noise level at a side of the vehicle 16 is reduced in comparison to a single inlet. Expansion chamber(s) 95 in the hood duct 74 can be sized to attenuate certain induction noise frequencies as required.

The inner panel 68 has an opening 86, also referred to herein as an entrance, as the opening 86 is in fluid communication with the cavity 72 and serves as an entrance for air from the duct 74 into the cavity 72. Because the opening 70 is in fluid communication with the first air inlet 24 when the hood is in the closed position, the opening 86 is also in fluid communication with the first air inlet 24 when the hood 64 is in the closed position. A seal 88 is secured to the housing 20 at the first air inlet 24 and seals to the hood inner panel 68 around the opening 70.

As shown in FIGS. 3 and 4, the duct 74 winds in a serpentine path from the opening 82 to an exit 90 of the duct 74. The exit 90 of the duct 74 mates to the entrance 86 of the hood inner panel 68. The serpentine path is evident in FIG. 4 and includes two bends 92, 94. The duct 74 is configured with an expansion chamber 95, also referred to as a plenum 95 having an expanded flow area between the forward-facing opening 82 and the exit opening 90. A width W1 of the duct 74 in the plenum 95 between the bends 92, 94 is larger than a width W2 of the duct 74 upstream of bend 92 and a width W3 of the duct 74 downstream of bend 94. The height H of the duct, shown in FIG. 4, remains relatively constant. Accordingly, a flow area taken at a cross-section at C of the plenum 95 in FIG. 4 will be greater than a flow area at a cross-section at D (just upstream of bend 92) or a cross-section at E (just downstream of bend 94) of FIG. 4. The greater flow area helps to reduce the flow rate through the portion of the duct 74 between the bends 92, 94. The reduced flow rate provides greater time for contaminants to settle out of the air flow in the section between the bends 92, 94. A drain 96 is located in the bottom side of the portion of the duct 74 with the expanded flow area to expel fluid or other contaminants from the air flow. Because the duct 74 is fastened to the underside of the hood inner panel 68, it can be detached and cleaned, if desired. The duct 74 can be plastic to avoid corrosion due to entrained moisture. For example, the duct 74 can be injection-molded plastic. The duct 74 can be molded with external ribs to increase stiffness. Additionally, the duct 74 can be formed in multiple pieces that interconnect. The duct 74 and the inlets 24, 28 are configured to provide an optimal mix of air from the forward-facing opening 78, as air from outside of the hood 64 will be lower in temperature than air in the fender cavity 62.

The second duct 98 is secured to the air outlet 32 and is configured to route air from the air outlet 32 to the engine 12. As shown in FIGS. 3 and 4, the first duct 74 is positioned above the second duct 98. One or more tuning devices can be secured to the second duct 98 and/or form part of the flow path from the air outlet 32 to the engine 12. FIG. 4 shows a hiss resonator 100 and FIG. 2 shows a port to a sound tuner 102 configured to reduce engine noise. An end 104 of the second duct 98 connects to either a throttle body or turbo charger to provide air to the engine 12, as is understood by those skilled in the art.

The relatively low air inlet temperature and relatively low pressure drop achievable by use of the air induction system with the dual inlet housing can improve vehicle metrics, such as hill climb time, engine performance with hill climb in extreme temperatures, and engine performance in stop-and-go city traffic. Testing shows a reduction in engine inlet air temperature in comparison to air drawn from the engine compartment. Testing has shown increased horsepower and decreased charge air cooler thermal load. An increase in horsepower was demonstrated during a trailering load event in comparison to a vehicle ingesting air sourced from the engine compartment. Charge air cooler thermal load was also reduced. Additionally, with the unfiltered side (i.e., the "dirty side") of the inner cavity formed in the housing being positioned low in the housing, water and debris ingestion in air flow to the engine is reduced. The dual inlet design can provide a greater inlet flow area, which reduces air flow velocity in comparison to a single inlet of smaller inlet flow area. Reduced air flow velocity can decrease contaminant ingestion. Additionally, the dual inlet design provides an auxiliary path if flow through one of the inlets 24, 28 is obstructed.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An air induction system for a vehicle having an engine, the air induction system comprising:
   a housing configured to be installed in the vehicle and defining an inner cavity; wherein the housing has a first wall with a first air inlet, a second wall with a second air inlet, and an air outlet for directing air to the engine when the housing is installed in the vehicle;
   a panel filter having a first side and a second side; wherein the panel filter is mounted within the housing and divides the inner cavity so that the first air inlet and the second air inlet are upstream of the panel filter and the air outlet is downstream of the panel filter when air flows through the housing from either of the air inlets to the air outlet and through the panel filter from the first side to the second side; wherein the first air inlet, the second air inlet, and the panel filter are positioned so that the first side is lower than the second side, when the housing is installed in the vehicle; and wherein the first air inlet and the second air inlet are in fluid communication with the inner cavity on the first side of the panel filter.

2. The air induction system of claim 1, wherein the housing has a bottom wall; and wherein the panel filter is spaced from the bottom wall.

3. The air induction system of claim 2, wherein the housing has a drain opening in the bottom wall.

4. The air induction system of claim 2, wherein the panel filter is positioned so that the first side is at an acute angle relative to the bottom wall.

5. The air induction system of claim 2, further comprising:
   a mass air flow sensor mounted in the housing between the panel filter and the air outlet.

6. A vehicle comprising:
   a vehicle body forming an engine compartment; wherein the vehicle body includes a fender at a side of the engine compartment;
   a hood connected to the vehicle body and positionable in a closed position to cover the engine compartment;
   an engine within the engine compartment;
   an air induction system including:
      a housing defining an inner cavity; wherein the housing has a first air inlet toward the hood, a second air inlet toward the fender, and an air outlet through which air is directed to the engine; wherein the housing is operatively connected to the vehicle body;

a panel filter having a first side and a second side; wherein the panel filter is mounted within the housing and divides the inner cavity so that the first inlet and the second inlet are upstream of the panel filter and the outlet is downstream of the panel filter when air flows through the housing from either of the inlets to the outlet and through the panel filter from the first side to the second side;

wherein the first air inlet, the second air inlet, and the panel filter are positioned so that the first side is lower than the second side;

wherein the housing has a bottom wall; wherein the panel filter is spaced from the bottom wall; and wherein the panel filter is positioned so that the first side is at an acute angle relative to the bottom wall.

7. The vehicle of claim 6, wherein the housing has a drain opening in the bottom wall.

8. The vehicle of claim 6, further comprising:
a mass air flow sensor mounted in the housing between the panel filter and the air outlet.

9. The vehicle of claim 6, wherein the fender forms an internal cavity and has an opening; and wherein the second air inlet is positioned at the opening so that the second air inlet is in fluid communication with the internal cavity through the opening.

10. The vehicle of claim 6, wherein the hood has an opening external to the engine compartment; wherein the hood has an inner panel with an entrance; wherein the hood has an exit in fluid communication with the entrance; wherein the exit is in fluid communication with the first air inlet when the hood is in the closed position; and wherein the air induction system further includes:
a duct secured to the hood inner panel and configured to route air from the opening to the entrance.

11. The vehicle of claim 10, wherein the air induction system further includes:
a seal at the first air inlet configured to seal to the hood with the exit opening in communication with the first air inlet when the hood is in the closed position.

12. The vehicle of claim 10, wherein the duct winds in a serpentine path from the opening to the entrance.

13. The vehicle of claim 12, wherein the duct is configured with an expanded flow area between the opening and the exit opening.

14. The vehicle of claim 13, wherein the duct has a drain in the expanded flow area.

15. The vehicle of claim 10, wherein the hood has a hood outer panel and a hood inner panel secured to the hood outer panel; and wherein the air induction system further includes:
a forward wall extending from hood outer panel to the hood inner panel;
a rearward wall extending from the hood outer panel to the hood inner panel; and
wherein a cavity is defined between the hood outer panel, the hood inner panel, the forward wall, and the rearward wall with the entrance and the exit in fluid communication with the cavity.

16. A vehicle comprising:
a vehicle body forming an engine compartment; wherein the vehicle body includes a fender at a side of the engine compartment; wherein the fender has an opening;
a hood connected to the vehicle body and positionable in a closed position to cover the engine compartment;
an engine within the engine compartment; wherein the hood has a forward-facing opening external to the engine compartment; wherein the hood has an inner panel with an entrance; wherein the hood has an exit in fluid communication with the entrance;
an air induction system including:
a housing operatively connected to the vehicle fender and defining an inner cavity; wherein the housing has a first air inlet opening toward the hood, a second air inlet in fluid communication with the opening in the fender, and an air outlet through which air is directed to the engine;
a panel filter having a first side and a second side; and wherein the panel filter is mounted within the housing and divides the inner cavity so that the first inlet and the second inlet are upstream of the panel filter and the outlet is downstream of the panel filter when air flows through the housing from either of the air inlets to the air outlet and through the panel filter from the first side to the second side;
wherein the exit is in fluid communication with the first air inlet when the hood is in the closed position;
a first duct secured to the hood inner panel and configured to route air from the forward-facing opening to the entrance;
a second duct secured to the air outlet and configured to route air from the air outlet to the engine; and wherein the first duct is positioned above the second duct.

17. The vehicle of claim 16, wherein the hood has a hood outer panel and a hood inner panel secured to the hood outer panel; wherein the air induction system further includes:
a forward wall extending from the hood outer panel to the hood inner panel;
a rearward wall extending from the hood outer panel to the hood inner panel; and
wherein a cavity is defined between the hood outer panel, the hood inner panel, the forward wall, and the rearward wall with the entrance and the exit in fluid communication with the cavity.

18. The vehicle of claim 17, wherein the first duct is configured with an expanded flow area between the forward-facing opening and the exit opening.

19. The vehicle of claim 1, wherein at least a portion of the panel filter is lower than both the first air inlet and the second air inlet when the housing is installed on the vehicle.

20. The vehicle of claim 6, wherein the first air inlet and the second air inlet are in fluid communication with the inner cavity on the first side of the panel filter.

* * * * *